Feb. 28, 1939.　　　S. B. DECHANT　　　2,148,537
CAN AND DISH COMBINATION
Filed Jan. 21, 1937　　　2 Sheets-Sheet 1

INVENTOR.
STELLA B. DECHANT.
BY Arlington L. White
ATTORNEY.

Feb. 28, 1939.　　　S. B. DECHANT　　　2,148,537
CAN AND DISH COMBINATION
Filed Jan. 21, 1937　　2 Sheets-Sheet 2

INVENTOR.
STELLA B. DECHANT
BY Arlington E. White
ATTORNEY.

Patented Feb. 28, 1939

2,148,537

UNITED STATES PATENT OFFICE 2,148,537

CAN AND DISH COMBINATION

Stella B. Dechant, Berkeley, Calif.

Application January 21, 1937, Serial No. 121,442

2 Claims. (Cl. 206—47)

The invention, in general, relates to means for receiving and holding food substances and more particularly relates to a folding dish for temporary use in holding and serving foods taken from containers.

A primary object of the invention is to provide a foldable dish capable of ready and convenient attachment to or disposal within a container of foods and readily removable therefrom for temporary use and then disposal.

Another object of my invention is to provide a folding dish of the aforementioned character which is relatively simple and inexpensive to fabricate.

Another object of the invention is to provide a novel combination of a food container and a folding dish marketable as a unit with the dish removably disposed within or removably secured to the container.

Other objects of the invention, together with some of the advantageous features thereof, will appear from the following description of a preferred embodiment and certain modifications thereof illustrated in the accompanying drawings. While the drawings show my preferred form and certain modified embodiments of the invention, it is to be understood that I am not to be limited to the precise embodiments illustrated, as my invention, as defined in the appended claims, can be embodied in a plurality and variety of forms.

Referring to the drawings.

In its preferred form, the folding dish of my invention preferably comprises a rectangular sheet adapted to be folded upon itself and fastened at its ends as well as adjacent its longitudinal center to provide an open top rectangular dish, the dish in turn being adapted to be folded compactly for disposal within or removable attachment to a container.

Figure 1:
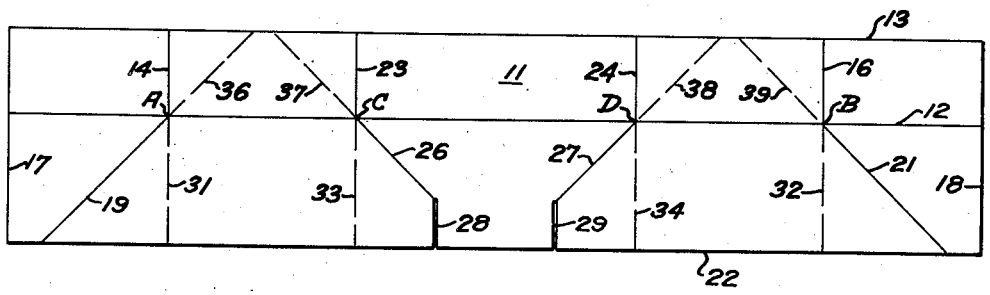
Figure 1 is a development of a preferred embodiment of the invention.

In accordance with the invention, I provide a flat sheet 11 preferably fabricated of a relatively stiff but flexible paper which conveniently can be waxed or paraffined to render the same impervious to water or other liquids, such as milk. The sheet 11 preferably is cut to a rectangular shape but greater in length than in width. A development of the folding dish of my invention is illustrated in Figure 1 of the drawings and it will be observed that the sheet 11 is scored or creased in a number of indicated places, not only from the obverse but also from the reverse side of the sheet. For convenience, I have indicated the crease lines made from the obverse side in full lines and the crease lines made from the reverse of the sheet in dotted lines.

As clearly shown in Figure 1, I provide a score or crease line 12 in the obverse side of sheet 11 which extends throughout the entire length of the sheet and relatively close to the lateral extremity 13 thereof. The location of crease line 12 determines the height of the sides and ends of the dish formed from the sheet or, in other words, the location of the score line 12 determines the depth of the dish. Crease lines 14 and 16 also are provided in the sheet commencing, respectively, at opposed points A and B on crease line 12. The points A and B preferably are equidistant from the opposite longitudinal extremities 17 and 18 of the sheet. As indicated, the crease or score lines 14 and 16 extend at susbtantially right-angles from the score line 12 to the adjacent lateral extremity 13 of the sheet. I also provide crease or score lines 19 and 21 in the obverse side of sheet 11 which extend, respectively, from the points A and B diagonally to the opposite lateral extremity 22 of sheet 11 and terminate at equidistant points from the opposite longitudinal extremities 17 and 18 of the sheet. The sheet 11 is further scored or creased from the obverse side on lines 23 and 24 commencing, respectively, at points C and D on line 12, the points C and D preferably being equidistant from the points A and B, respectively. The location of the points A, B, C and D determines the length of the sides and the ends of the dish to be formed from the sheet. The score or crease lines 23 and 24 extend from the crease line 12 to the adjacent lateral extremity 13 of the sheet. In addition to the foregoing crease lines, the sheet 11 also is creased on diagonal lines 26 and 27 extending, respectively from the points C and D toward the lateral extremity 22 of the sheet and terminating at the inner ends of slits 28 and 29 respectively. The slits 28 and 29 which are formed in the sheet preferably extend inwardly from the lateral extremity 22 to points short of the transverse center of the sheet and preferably commence at points equidistant from the longitudinal center of the sheet and extend at substantially right-angles to the lateral extremity 22.

After the above described score or crease lines have been made in the obverse side of the sheet 11, the sheet is reversed and the following crease lines made therein, all as indicated in the dotted line showings of Figure 1 of the drawings. These additional crease lines include a pair of lines 31 and 32 which extend at substantially right-angles to the line 12 and from the points A and B respectively to the lateral extremity 22 of the sheet. The crease lines made in the reverse side of sheet 11 also include a pair of lines 33 and 34 extending at substantially right-angles from the points C and D, respectively, to the lateral extremity 22 of the sheet. I also provide two sets of diagonal crease lines extending from the points A and C respectively and from the points B and D respectively. One set of these diagonal crease lines is designated in the drawings, Figure 1, as lines 36 and 37. It is to be noted that these diagonal lines extend to the lateral extremity 13 of the sheet and do not meet in a point but rather terminate at such extremity in spaced relationship. The other set of diagonal lines, designated 38 and 39, extending from the points D and B, respectively, terminate at spaced points at the lateral extremity 13 of the sheet.

Figure 2:
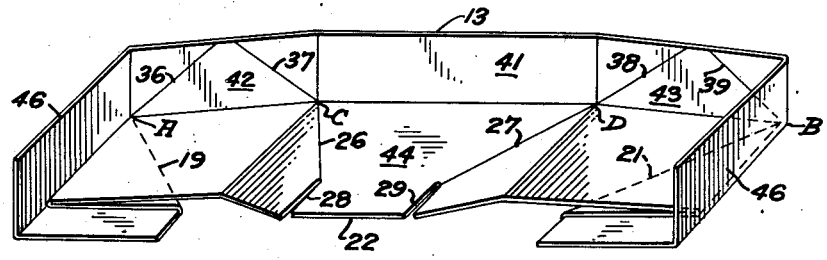
Figure 2 is a perspective view of the embodiment shown in Figure 1 showing the dish in partially formed condition.
Figure 3:
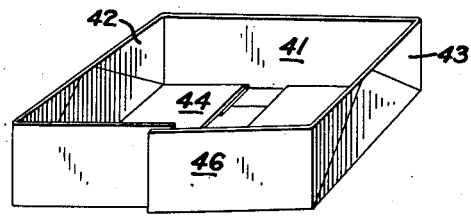
Figure 3 is a perspective of the preferred embodiment of my invention illustrating the same just prior to sealing the dish in complete form.

The sheet 11, scored or creased as hereinabove described, is now in condition for folding upon itself to provide the folding dish of my invention. As indicated in Figure 2 of the drawings, the points A and B on score line 12 serve as initial pivotal points for forming one side and two temporary ends of the dish, which, as can be observed from the drawings, is an open top dish. The sheet 11 is first folded along the score line 12 and then raised and pivoted about the points A and B and in this manner one side 41 of the dish is formed. The sheet is then further pivoted about the points C and D, and raised at the same time thereby forming the two ends 42 and 43 of the dish as well as the incomplete or broken bottom 44 and the incomplete or broken side 46. See, in this connection, Figure 3 of the drawings indicating the result of the second forming operation. After the sheet has been pivoted as described about both points A and B as well as points C and D and the partially complete dish as indicated in Figure 3 of the drawings, has been formed, the broken bottom 44 and broken side 46 are then adhesively or otherwise fastened together to complete the fabrication of the dish. The completed dish is clearly illustrated in Figure 4 of the drawings and it will be observed that the side 41 of the dish is equal in length to the distance C—D; the side 46 is equal to the distance A—B; the end 42 is A—C and the end 43 is B—D. Moreover the points A, B, C, and D are the four corners of the bottom 44 of the dish and the score line 12 is the perimeter of the bottom 44, while the lateral extremity 13 of the sheet forms the rim of the dish.

Figure 4:
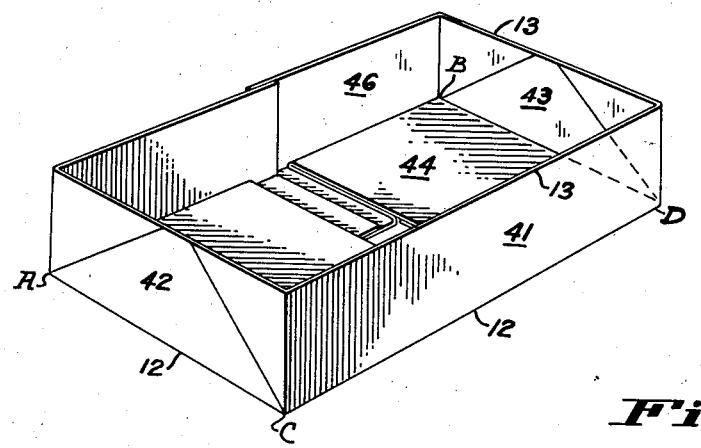
Figure 4 is a perspective of the complete preferred embodiment of the folding dish of my invention.
Figure 5:
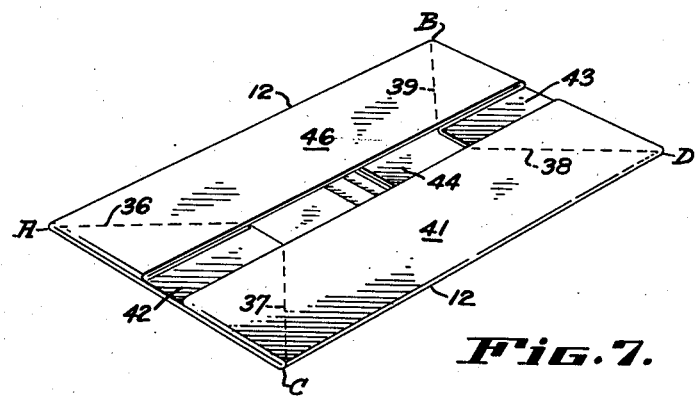
Figure 5 is another perspective of the embodiment illustrated in Figure 4 but in a folded condition for disposal within or attachment to a food container.

In accordance with the invention, the dish illustrated in Figure 4 of the drawings is adapted to be folded compactly into a packet as shown in Figure 5 of the drawings. To effect this result, it is only necessary to fold the sides 41 and 46 inwardly along the crease or score line 12 and then, or at the same time, fold the ends 42 and 43 inwardly not only along the score line 12 but also along the pairs of crease lines 36 and 37, and 38 and 39. The folding dish, folded as indicated in Figure 5 of the drawings, is readily disposed within a container of foods, particularly of the conventional box lunch containers. It is clear of course that any number of the folding dishes of my invention can be disposed in such a container for use on picnics or other gatherings.

Figure 6:
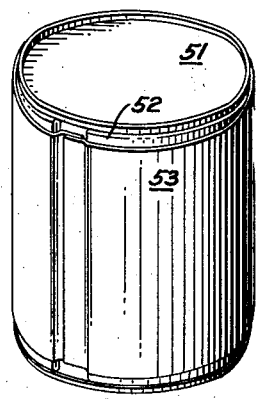
Figure 6 is a perspective view of the combination of folding dish and food container.
Figure 7:
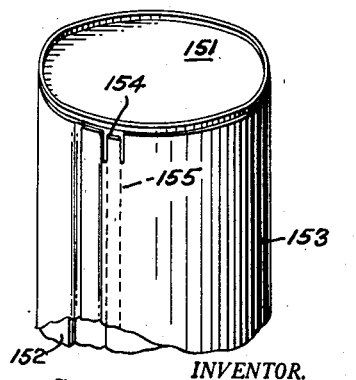
Figure 7 is a modified embodiment of the combination of my invention.

In Figures 6 and 7 of the drawings I have shown two modifications of my invention exemplified in the combinations of my above described folding dish with cans. Thus, in the modified embodiment of the invention illustrated in Figure 6 I have provided a food container or can 51 to which is snugly fitted and removably attached a folded paper dish 52 of the character shown in Figures 4 and 5 of the drawings. If desired, the dish 52 may serve as the label for the food container and in this regard the outer surface of the bottom of the dish 52 can be printed with the appropriate wording and name and trademark of the manufacturer of the food dispensed in the can so that when the dish is adhesively fastened to the can with its bottom exposed, the trade will be advised of the contents of the can. However, the conventional type of label 53 may be utilized for attaching the dish around the can and to this end the length of the dish is made shorter than the circumference of the can thereby leaving a portion of the circumference of the can for adhesively fastening the label thereto. Note, also that the width of the dish 52 may be equal to the height of the can and the label somewhat shorter so that portions of the dish may be exposed. This arrangement is illustrated in the embodiment shown in Figure 6 of the drawings. To remove the dish and render the same available for use, it is only necessary to slit the label. Note that the label is not glued or otherwise fastened to the dish but only to the can or container so there will be no difficulty in removing the dish. After removal, it is only necessary to open up the dish and set the same on a table or the floor to receive the contents of the container.

In the modification of Figure 7 of the drawings, the height of the can 151 is indicated to be greater than the width of the folded dish 152 while the label 153 is substantially the same dimensions as the can. The length of the folding dish 152, however, is shorter than the circumference of can 151 so that a space on the circumference is provided for securing the label to the can. In this modification, as well as the modification shown in Figure 6 of the drawings, the label may be provided with a tab 154 and likewise may be scored so that by grasping the tab and tearing along the score line 156, the label can conveniently be removed and the dish obtained.

The folding dish of my invention has a wide variety of applications and is especially useful for the feeding of pets in the home or elsewhere where china or permanent dishes are not desired to be used. Since the dish that I have provided is readily disposable in incinerators or the like and since permanent dishes can be dispensed with and no more sterilization thereof will be required, the use of my dish affords a sanitary as well as convenient means for serving foods either at picnics or feeding pets their dog or cat foods in the home. The combination of the folding dish with the conventional food can affords a convenient marketable unit and handy for the housewife.

It is to be understood that the appended claims are to be accorded a range of equivalents commensurate in scope with the advance made over the prior art.

I claim:

1. A new article of manufacture comprising the combination of a can adapted to hold foods or other substances, a folding dish of flexible sheet material partially encircling the body portion of said can, and a label overlying said dish and adhesively fastened to the exposed surface of said body portion of said can between the ends of said dish whereby said dish is removably attached to said can.

2. A new article of manufacture comprising the combination of a can adapted to hold foods or other substances, a folding dish of flexible sheet material partially encircling the body portion of said can, a label overlying said dish and adhesively secured to the exposed surface of said body portion of said can between the ends of said dish, and means for slitting said label to gain access to said dish for ready removal of said dish from underneath said label.

STELLA B. DECHANT.